United States Patent [19]
Shoroff et al.

[11] Patent Number: 6,023,744
[45] Date of Patent: Feb. 8, 2000

[54] METHOD AND MECHANISM FOR FREEING DISK SPACE IN A FILE SYSTEM

[75] Inventors: Srikanth Shoroff; Kyle G. Peltonen, both of Issaquah; Brian T. Berkowitz, Seattle; Mark J. Zbikowski, Woodinville; Bartosz B. Milewski, Seattle, all of Wash.

[73] Assignee: Microsoft Corporation, Redmond, Wash.

[21] Appl. No.: 08/813,621

[22] Filed: Mar. 7, 1997

[51] Int. Cl.[7] .................................................. G06F 17/30
[52] U.S. Cl. ............................ 711/4; 711/111; 707/205
[58] Field of Search ....................... 711/4, 111; 707/204, 707/205, 206

[56] References Cited

U.S. PATENT DOCUMENTS

| | | | |
|---|---|---|---|
| 5,062,042 | 10/1991 | Binkley | 364/200 |
| 5,241,673 | 8/1993 | Schelvis | 395/600 |
| 5,403,639 | 4/1995 | Belsan | 395/600 |
| 5,574,952 | 11/1996 | Brady | 395/888 |
| 5,596,736 | 1/1997 | Kerns | 395/404 |
| 5,794,229 | 8/1998 | French et al. | 707/2 |

OTHER PUBLICATIONS

Copy of International Search Report in Corresponding PCT Application No. PCT/US98/04567.

*Primary Examiner*—Jack A. Lane
*Attorney, Agent, or Firm*—Michalik & Wylie, PLLC

[57] ABSTRACT

A method and mechanism for rapidly freeing storage space allocated to any logical portion of a file. An application program provides the file system with information indicating a block of logical data to free. The file system converts the information to the physical allocation units such as the clusters corresponding to the logical block of data, and manipulates the file's meta data to indicate that the physical space is no longer allocated to the file. The file system then adds the space to disk free space. Applications such as merge applications and those managing FIFO queues may use the method and mechanism to shrink a file from the start of the file toward the end thereof without copying the logical data or adjusting internal pointers relative to the logical file data.

42 Claims, 12 Drawing Sheets

METHOD AND MECHANISM FOR FREEING DISK SPACE IN A FILE SYSTEM

FIELD OF THE INVENTION

The invention relates generally to file systems, and more particularly to an improved method and mechanism for freeing disk space allocated to a file by a file system.

BACKGROUND OF THE INVENTION

One of the responsibilities of a file system is to map the relationship between the logical data in a file and the physical allocation units (e.g., clusters) located on a permanent storage volume wherein the data is stored. When the amount of useful data in a file is reduced in size, an application program dealing with that file notifies the file system of the reduced file size so that some of the disk space allocated to the file may be freed for reuse. If the data to be freed is at the front of the file, it is the responsibility of the application program to shift the remaining data to the start of the file and inform the file system of the new file size relative to the front of the file. The file system frees space by returning the clusters mapped to the end of the file to free space, essentially deleting the unneeded contents from the end of the file.

However, many applications process data in a sequential, i.e., front-to-back order. For example, in a merge application, two or more sorted source files are merged into a single sorted target file, at which time the source files are no longer needed. Such a merge is accomplished by sequentially processing data from each of the source files by combining the data according to the appropriate sort order and writing the combined data into a sorted target file. Because a merge application program often merges large files, (e.g., 500 megabytes), the source file reads and target file writes are repeatedly performed on small amounts of data until all of the source data is processed. Upon completion of the source data processing, the source files are typically deleted.

While the above-described merging approach is very straightforward, it requires that a large amount of free disk space be available during the operation. For example, if the combined sizes of the source files total 500 megabytes, the target file may also be as much as 500 megabytes in size. To perform the merge, up to 500 megabytes of disk space needs to be free before the source files can be deleted. This is true even though the free disk space is essentially temporary, since once the source files are deleted the total occupied disk space will be generally unchanged. Of course, the target file may be smaller than the source files, if some duplicate data was removed. As can be appreciated, such a large amount of free space is not always available on a given disk volume. Moreover, it is highly inefficient to have the application program regularly shift large amounts of data to the front of each file so that a source file can shrink from the back as its data is consumed.

To solve the above-described temporary space problem, a second approach to merging files is to write the merge application program to manage multiple, smaller files which together constitute a large logical file. The application program tracks how the smaller files compose the larger file, and manages the deletion of certain files to free up disk space as the data is processed. However, there is substantial complexity in managing the multiple files which constitute the large logical file. For example, the program will have to separate a large source file into smaller ones, name each file and maintain the logical relationships therebetween, essentially acting as a file system within a file system. Moreover, most operating systems limit the number of simultaneous open files that an application can have, and there is a performance penalty with a high number of simultaneous open files. To avoid having too many open files, even more complexity has to be added to the application program.

Other applications that similarly process data in a front-to-back order are those dealing with first-in, first-out (FIFO) queue files. With such a queue, new items are added to the end of the queue while unneeded items are removed from the front of the queue. A FIFO queue thus supports an EnQueue operation which adds a new item to the end of a queue, and a DeQueue operation, which removes an item from the front of the queue if the queue is not empty. An IsEmpty operation is also provided which tests if the queue is empty.

Dequeueing individual items is expensive with a persistent FIFO queue, that is, a FIFO queue stored on a permanent storage medium such as a disk. The expense is present because a substantial number of expensive input-output disk operations need to be performed to clean a dequeued item from a file. Indeed, with persistent FIFO queues, rather than clean each item from the file immediately after it is a dequeued, the program which cleans up the queue first accumulates a number of dequeued items by remembering the items, and later cleans those items from the file in bulk. Such batch cleaning of dequeued items amortizes the cost of dequeueing over a number of dequeueing operations.

A number of methods are known for cleaning up a persistent FIFO queue file having both dequeued (but not cleaned) items and remaining, non-dequeued items. A first method involves overwriting the dequeued data with the remaining data, i.e., shifting the remaining data to the front of the file, and then reducing the file size based on the size of the remaining data. This is accomplished by creating a temporary file equal to the size of the remaining data, copying the remaining data to the temporary file, and then copying the remaining data back to the original file starting at the front of the file. The temporary file is then deleted.

A second method is similar to the first, but instead of copying the temporary file data back to the original file, the temporary file becomes a new persistent FIFO queue file, and the old FIFO queue file is deleted. The file system renames or updates file header information with the name of the new FIFO queue file as necessary.

However, in both the first and second methods, temporary disk space needs to be created equal to the size of the non-dequeued data. Moreover, the first and second methods involve copying potentially large amounts of data, and copying data is very expensive.

A third method involves overwriting the dequeued data with the non-dequeued data by moving the non-dequeued data to the front of the file within the file itself. However, although no temporary free space is needed with this approach, substantial data copying still takes place in order to move the data. Moreover, if a system failure occurs during the copying, the file may be in an inconsistent state.

Lastly, the items may be maintained within a number of smaller, serially numbered files ranging from a first file to a last file. New items are appended to the last file until that file becomes filled, at which time a new file is created and becomes the last file, increasing the total number of files. When all of the items in the first file are dequeued, the first file is deleted, returning that file's space to the file system. As can be appreciated, this method requires the development and maintenance of an extra, complex layer of file management software.

OBJECTS AND SUMMARY OF THE INVENTION

Accordingly, it is a general object of the present invention to provide a method and mechanism for freeing disk space allocated to any logical portion of a file in a file system.

It is a more particular object to provide such a method and mechanism that rapidly frees disk space while eliminating the need for copying large amounts of data or allocating large amounts of temporary space.

Another object is to provide such a method and mechanism of the above kind that is built into a file system.

A related object is to provide the method and mechanism that functions with existing safeguards possessed by a file system to protect against system failures.

In accomplishing those objects, it is a related object to provide a method and mechanism as characterized above that may be easily utilized by an application program such as a merge application or an application that operates with a persistent FIFO queue.

Yet another object is to provide a fast, simple and reliable method and mechanism that is extensible and works with virtually any file system.

Briefly, the present invention provides a method and mechanism for freeing storage space allocated to a file in a persistent storage medium. A file system maintains mapping data that associates the file with physical storage space locations in the storage medium. An application program or the like provides the file system with information identifying the file and a selected logical block of data in the file. The file system receives the information and accesses the mapping data to determine the physical locations in the persistent storage medium that correspond to the selected logical block of data. The file system modifies the mapping data to indicate that the physical locations are no longer allocated to the file, and adds the physical locations to free space. The method and mechanism may be used by a merge application to shrink source files as the data therefrom is added to a growing target file, or to dequeue space from the front of a persistent FIFO queue.

Other objects and advantages will become apparent from the following detailed description when taken in conjunction with the drawings, in which:

DETAILED DESCRIPTION OF THE PREFERRED EMBODIMENT

Figure 1:
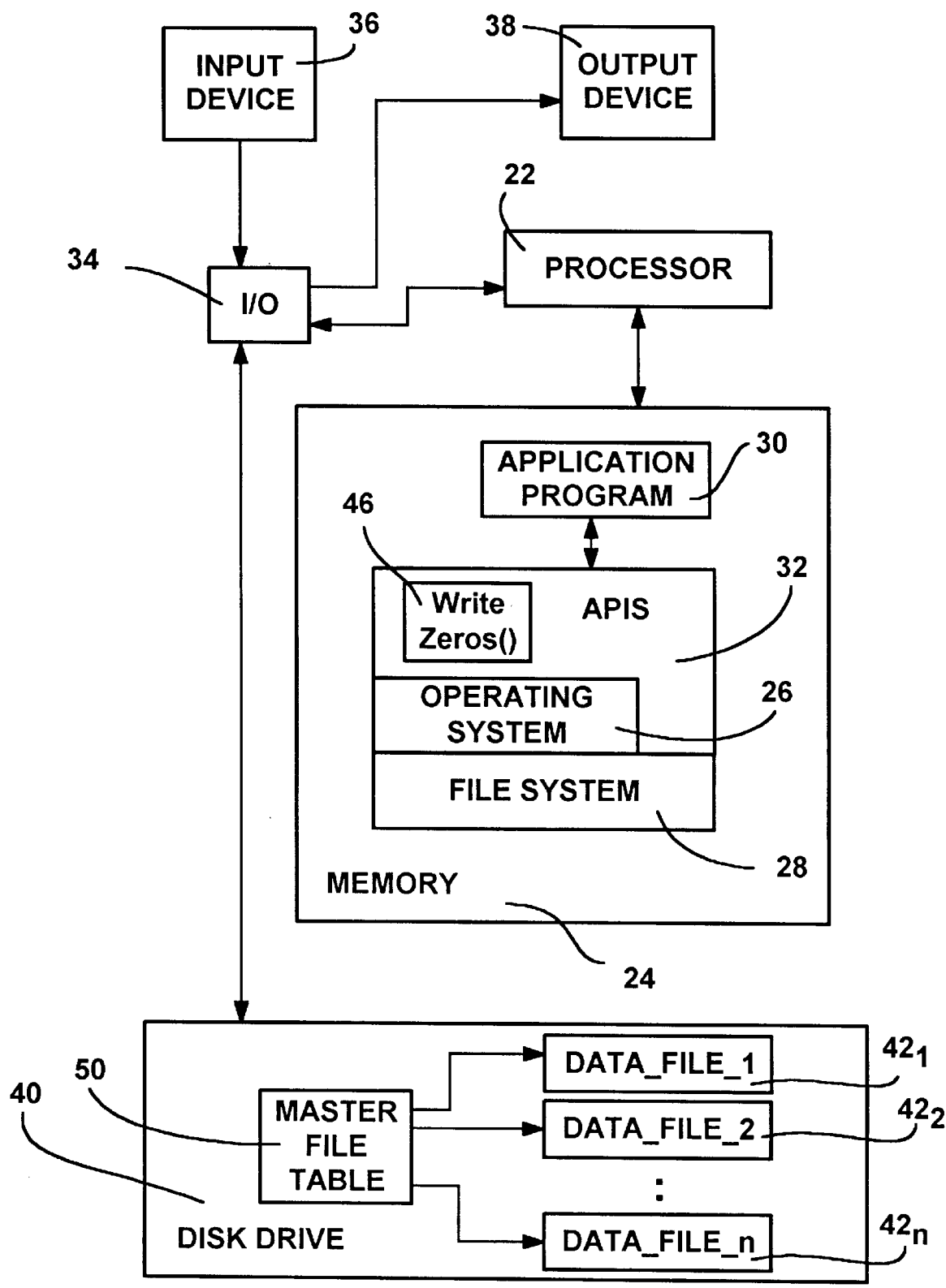
FIG. 1 is a block diagram representing a computer system in which the present invention may be incorporated.

Turning to the drawings and referring first to FIG. 1, there is shown a computer system generally designated 20 into which the present invention may be incorporated. The illustrated computer system 20 may be a server, a workstation, or a combination thereof, and may be connected in a known manner to one or more other computer-based resources. Of course, as will become apparent, the invention is not limited to any particular type of computer or network architecture, and may be incorporated into a stand-alone personal computer or the like.

As shown in FIG. 1, the computer system 20 includes a processor 22 connected to a memory 24 having an operating system 26 loaded therein. Preferably, the operating system 26 is Microsoft Corporation's Windows NT™ operating system. The computer 20 has a file system 28 such as the Windows NT™ File System (NTFS) associated with or included within the operating system 26. An application program 30 in the memory 24 interfaces with the operating system 26 and the file system 28 through application programming interfaces (APIs) 32.

The computer system 20 also includes input-output (I/O) circuitry 34 for connecting the computer system to one or more networked devices, to one or more input devices 36 such as a keyboard and/or mouse, and/or to one or more output devices 38 such as a monitor and/or speakers. The computer system 20 also includes a permanent storage medium such as a hard disk drive 40.

The file system 28 manages the files on the hard disk drive 40 and generally contains methods for (1) storing, referencing, sharing and securing files, (2) accessing file data and (3) maintaining file integrity. Notwithstanding, there is not always a clear distinction between a file system and its associated operating system, particularly with those file systems contained within an operating system. Accordingly, it is understood that any or all of the processes or steps attributed herein to the file system 28 may alternatively be performed by the operating system 26, and vice-versa.

As is well known, the disk drive 40 stores a number of files $42_1$–$42_n$ having logically organized data stored in allocation units physically scattered among various locations on the disk drive 40. An allocation unit is the fundamental storage unit on a given disk volume, and may be a cluster composed of one or more disk sectors. To maintain the scattered file portions as a logically contiguous block of data, the file system 28 such as the FAT (File Allocation Table) system of MS-DOS, Microsoft's Object File System (OFS) and NTFS stores a map associated with each file's meta data ordering the allocation units associated therewith.

Figure 2:
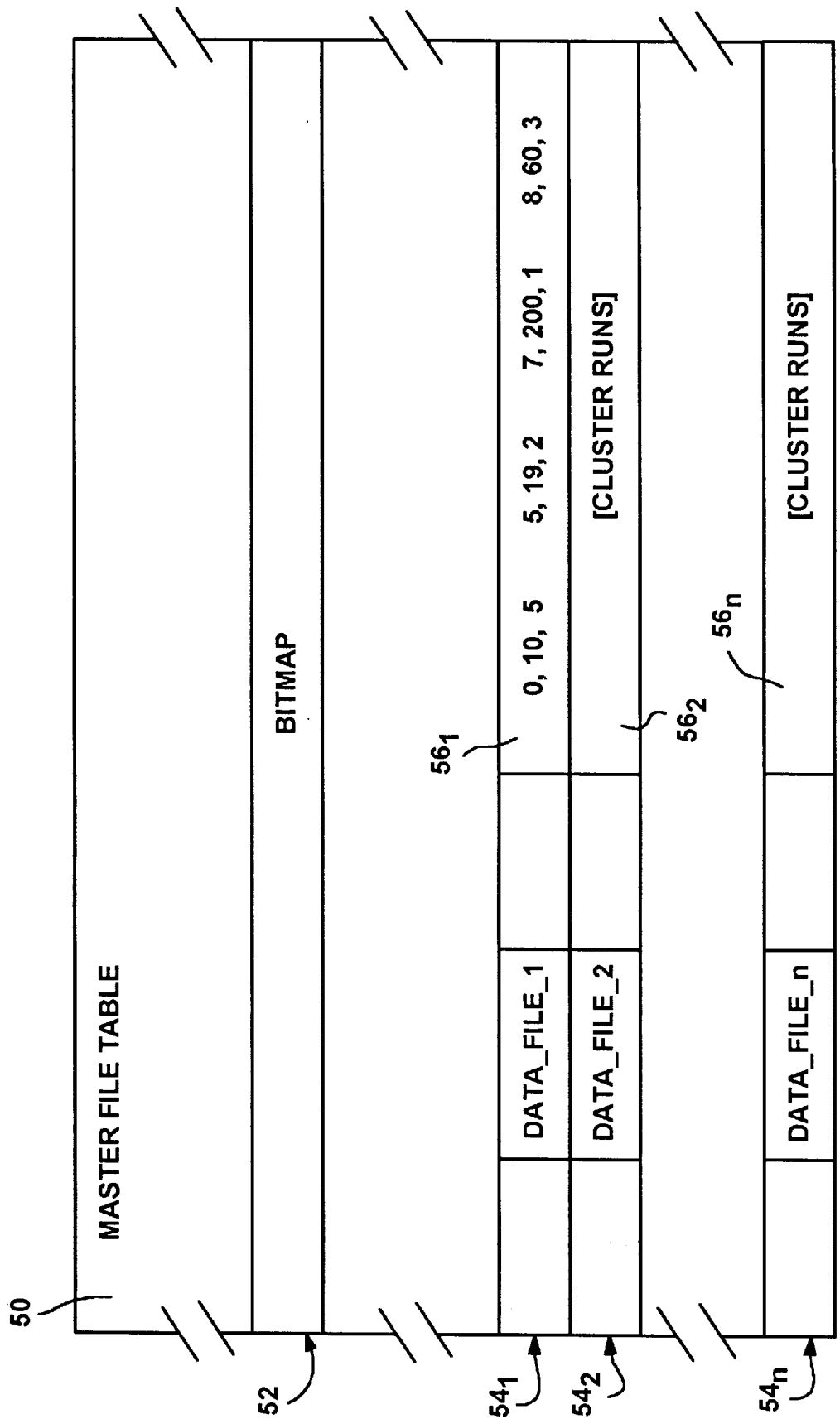
FIG. 2 is a diagram representing a table for storing file system meta data on a disk volume.

FIG. 2 generally shows how the files $42_1$–$42_n$ are organized in the NTFS file system, as described in the publication "Inside the Windows NT File System," H. Custer, Microsoft Press, 1994. In NTFS, the allocation unit is a cluster, and information about a given NTFS volume is contained in a master file table 50 organized as a set of records. For example, the master file table contains a bitmap record 52 having a bit for each cluster on the volume, with each bit having a value representative of whether a cluster is allocated to a file or is free space. In addition, information about each file $42_1$–$42_n$ on the NTFS volume is maintained in a record $54_1$–$54_n$. Each record $54_1$–$54_n$ is in turn composed of a number of fields, including a data field $56_1$–$56_n$, having cluster mapping information therein. However, instead of having the meta data store an ordered list of the individual clusters that make up a file, NTFS tracks contiguous runs of clusters for each file $42_1$–$42_n$. This saves space in the meta data because the number of clusters in a large file is itself a large number, and NTFS generally attempts to keep a file's clusters as contiguous as possible.

As shown in FIG. 2, for each run of contiguous clusters in a file such as $42_1$, the data field $56_1$ includes a first number representing the virtual cluster number of a file, a second number representing the physical location of the cluster on the disk, and a third number representing how many contiguous clusters are in that run. For example, as shown in FIG. 2, the data field $56_1$ in the record $54_1$ maps eleven virtual clusters to file $42_1$, starting with virtual cluster 0 mapped to actual cluster 10. The data extends for 5 contiguous clusters of data, with virtual clusters 0 through 4 corresponding to actual clusters 10 through 14. Virtual cluster 5 is the next cluster that contains file data, and is mapped to actual cluster 19 as shown in a second run. This second run extends for a length of 2, and thus virtual cluster 6 is effectively mapped to actual cluster 20 by this run. By following the other entries in data filed $56_1$, it is understood how the eleven physical clusters kept in record $54_1$ are mapped to the logically organized data in file $42_1$.

Figure 3:
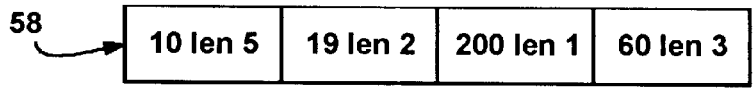
FIGS. 3 and 4 are representations of extent lists before and after disk space is freed, respectively, in accordance with one aspect of the present invention.

The cluster runs effectively make up what is referred to as an extent list of a file, which, as shown in FIG. 3, contains at least the first actual cluster number in each run and the length of the run of clusters for each non-contiguous cluster in a given file. As can be appreciated, all or part of such an extent list 58 may be placed in a file buffer in the memory 24 for each open file (such as the file $42_1$) to give the file system 28 high speed access to the cluster mapping information. Alternatively, the file system 28 may directly utilize the meta data in the data field 52 of the master file table 50 to obtain the needed file information, making the extent list 58 superfluous.

However, for purposes of simplicity, the invention will be described primarily with extent lists. For example, the extent list 58 (FIG. 3) corresponding to file $42_1$ and therefore data field $56_1$ similarly shows that file $42_1$ is made up of four runs of actual cluster locations, starting at cluster 10 for a length of 5 (i.e., running from 10 through 14), continuing to cluster 19 for a length of 2, continuing to cluster 200 for a length of 1 and ending with a run of three clusters from cluster 60 (clusters 60 through 62).

In accordance with one aspect of the invention and as described in more detail below, an application program 30 may free, i.e., decommit, any section of a file's data, and is not limited to freeing space only at the end of a file. To accomplish the freeing of space, the application program 30 places a call to the file system 28 (via a defined API 46 within the APIs 32) to decommit a section of data that is no longer needed but is still allocated to a file. Preferably, the section of data is a multiple of a predefined size that corresponds to one or more clusters.

To free the space, the file system 28 manipulates the file's meta data in a manner that is essentially invisible to the application program 30. In particular, the application program 30 maintains its internal pointers and offsets as if the decommitted space was still part of the file. Of course, once the decommitted block of data no longer belongs to the file it cannot be written to or read from, however the application program 30 need not make any adjustments other than to ensure it no longer needs the data or the space before decommitting the space. As discussed in more detail below, if the application program attempts to read the decommitted space, zeros can be returned, and if it attempts to write, the decommitted space can be recommitted.

Turning to an explanation of the operation of the invention, when the API 46 of the present invention is first called by an application program 30, the program 30 passes information to the API 46 including the handle of the file (e.g., file $42_1$ having a handle of 5) that contains the space to decommit. Also passed by the application program 30 is an offset to the logical location to start the decommit (e.g., an offset pointer indicating a number of bytes from the beginning of the file) and a length value, (i.e., an amount of space such as the number of bytes) to decommit. For example, the call for file $42_1$ might pass a file handle equal to 5, an offset of one megabyte and a length of 512 kilobytes. In a preferred embodiment, the file handle corresponds to an open file, otherwise the API 46 returns an error message.

To maintain simplicity, the offset and length values, in bytes, preferably correspond to multiples of a unit called a file section. Generally, the size of a file section is arbitrary but fixed within a file system 28, and is chosen with some relationship to how the file system 28 organizes data. For example, in NTFS a file section's size is a multiple of the size of the clusters on a disk volume, and has been tentatively chosen to equal 64 kilobytes. This 64 kilobyte size is a multiple of either a 512 byte cluster, a 1 kilobyte cluster, a 2 kilobyte cluster and so on, any of which may be in use with NTFS. In OFS, the file section size is 256 kilobytes. The size is also chosen so that the number of disk 40 I/O operations are balanced against the amount of space that is freed in each operation, i.e., large enough to avoid having to perform many small decommits but small enough so that a lot of temporary disk space is not needed before a decommit can take place. Of course, as will become apparent below, the application program 30 may decommit more than one file section in a single API call. For example, a single API call may request that the API 46 decommit 512 kilobytes, which corresponds to eight, 64-kilobyte file sections.

If an application program 30 calls the API 46 with an offset and/or length that is not a multiple of a file section, the API 46 returns an error message or the like. However, a proper application program 30 will either know the size of a file section in advance or be capable of interrogating the file system 28 to determine the size of a file section. As a result, it is alternatively feasible to have the application program 30 pass file sections instead of bytes as units for the offset and length values.

Notwithstanding, it is also feasible, although more complex, to have the application program 30 pass any arbitrary byte value for its offset and length parameters, rather than values which correspond to file section sizes. In such an alternative arrangement, the file system 28 converts the offset and length to file sections and decommits as many file sections as possible (which may be zero). The file system 28 then returns to the application program 30 a remainder corresponding to the number of bytes that were not decommitted, or alternatively a pointer indicating the extent of decommitting. The application program 30 may then adjust a decommitting pointer based on the returned value. Alternatively, the file system 28 may itself track the remainder and decommit those bytes if the application program 30 later requests that the rest of a partial file section be decommitted.

Nevertheless, it is preferred that the application program 30 use a predefined file section size, and thus the following examples are based on the preferred API calling requirements. Moreover, when dealing with typical file section sizes such as 64 kilobytes, the cluster corresponding to an offset parameter may be deeply embedded within the extent list and the number of clusters to decommit thereafter may be a relatively large number. To avoid dealing with such large numbers, for purposes of the following examples, unless otherwise specified, it will be assumed that the size of a given file section equals the size of a cluster, i.e., any particular cluster may be decommitted. Although somewhat impractical, it can be seen that the use of such a small file section size is feasible and simplifies the following examples without departing from the spirit and scope of the invention.

Figure 10:
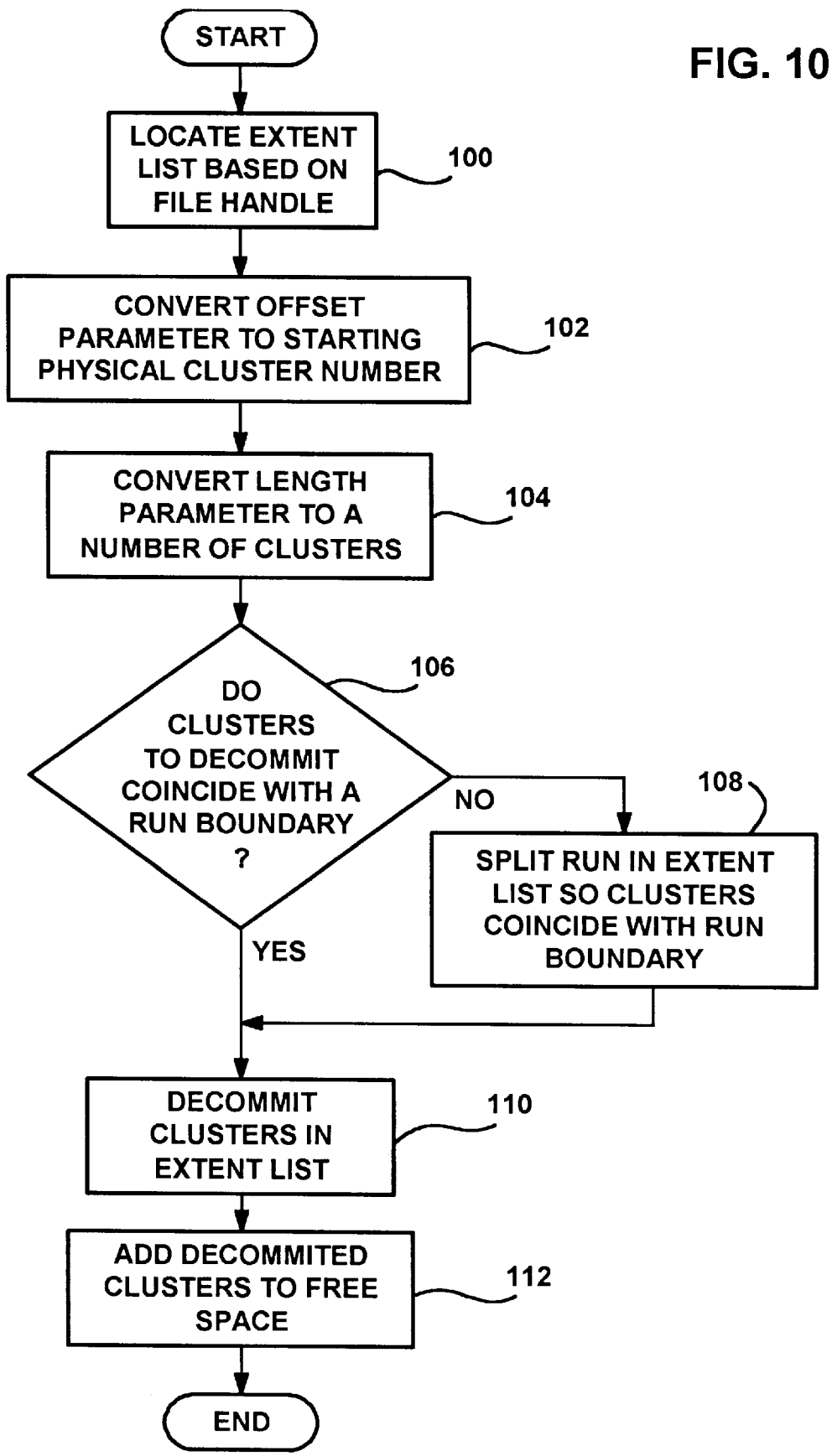
FIG. 10 is a flow diagram representing the general steps taken in freeing disk space in accordance with one aspect of the present invention.

FIG. 3 represents the extent list 58 for file $42_1$ having a file handle of 5. In a first example, the application program 30 calls the API 46 requesting to decommit the file having handle 5, starting at an offset of twenty kilobytes, and for a length of eight kilobytes. In this example the cluster factor is four kilobytes per cluster and one file section is four kilobytes in size. When the API 46 is called, at step 100 of FIG. 10 the API 46 uses the file handle to select the appropriate file information, such as the extent list 58. At step 102, the API 46 converts the twenty kilobyte offset to an offset of five clusters from the beginning of the file by dividing the offset by the cluster factor cluster of four kilobytes per cluster. Since the first entry in the extent list is cluster 10, length 5, the file system knows that clusters 10, 11, 12, 13 and 14 are allocated, in that order, to the file $42_1$ as its first five clusters. Thus, the offset value points to cluster 19, the second run. Step 104 converts the length parameter to two clusters by dividing eight kilobytes by the cluster factor of four kilobytes per cluster. Thus, as evident from FIG. 3, clusters 19 and 20 are to be decommitted.

Step 106 next determines if the clusters to decommit, in this instance clusters 19 and 20, fall on a run boundary. In other words, step 106 determines if cluster 19 is at the beginning of a run and cluster 20 is at the end of a run. In the present example, clusters 19 and 20 start and end a run, and thus the process branches to step 110.

Figure 4:

At step 110, the clusters 19 and 20 are decommitted by modifying the meta data, more particularly by changing a value in the extent list 58 to indicate that the clusters 19 and 20 are no longer part of the file. As shown in FIG. 4, a value of minus one (−1) overwrites the actual cluster number 19, although any predetermined value that does not represent a valid cluster number may be alternatively chosen to be the indicating value. Lastly, at step 112, the decommitted clusters 19 and 20 are returned to free space. In the NTFS system, this is accomplished in the bitmap 52 by toggling the values of the bits therein corresponding to clusters 19 and 20. Steps 110 and 112 are preferably transacted to guarantee all-or-nothing operation in the event of a system failure.

Figure 5A:
FIG. 5A is a representation of the extent list of FIG. 3 in the process of being modified in accordance with one aspect of the present invention.
Figure 5B:
FIG. 5B is a representation of the extent list of FIG. 5A after having been modified.

FIGS. 3 and 5A–5B illustrate an example wherein the decommitted cluster or clusters do not precisely coincide with a run boundary. In this example, given the same extent list shown in FIG. 3, and using the same cluster factor of four KB per cluster and the same file section size of four KB, cluster 13 is to be decommitted. As described above, the application program 30 initiates such a freeing of the space by calling the API 46 with a file handle equal to 5, (file $42_1$), an offset of twelve kilobytes, and a length of four kilobytes. As also described above, using these parameters, steps 100–104 convert the offset and length parameters to cluster information and determine that only cluster 13 is to be decommitted.

However, at step 106, it is determined that cluster 13 does not coincide with a run, but rather is part of a larger run. As a result, step 106 branches to step 108 where the meta data in extent list 58 is modified by splitting the run of 10 length 5 into multiple runs of 10 length 3, 13 length 1 and 14 length 1, as shown in FIG. 5A. For example, the modification may be accomplished by copying the runs of the extent list 58 into temporary space and recopying the runs back into the extent list 58 space, inserting the new information and modifying the existing information where appropriate. Note that FIG. 5A effectively lists the same clusters as FIG. 3, but in FIG. 5A, the cluster 13 now coincides with a run boundary.

Following step 108, the space is decommitted at step 110 by indicating in the extent list 58 that cluster 13 is no longer allocated to the file $42_1$. The decommitting of cluster 13 is shown in the modified extent list of FIG. 5B wherein a minus one has been written in place of cluster 13. Lastly, at step 112, the decommitted cluster 13 is returned to free space (in NTFS) by modifying the bitmap 52 as described above.

Figure 6:
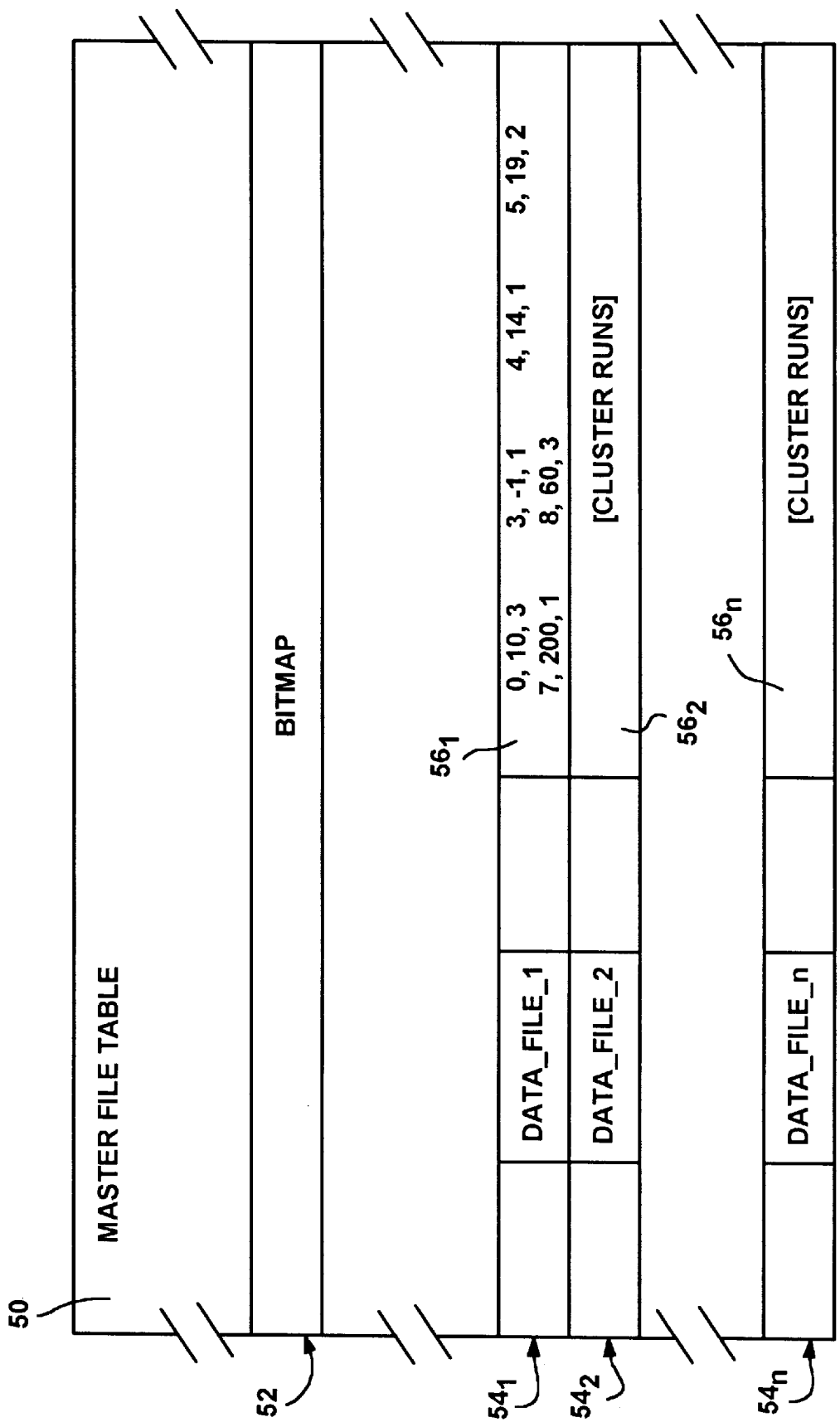
FIG. 6 is a diagram representing the table of FIG. 2 after having been modified in accordance with one aspect of the present invention.

It can be appreciated that the manipulation of the meta data may be performed directly in the master file table 50 rather than via extent lists. FIG. 6 shows the way the runs appear if the data field $56_1$ of record $54_1$ is directly modified in response to cluster 13 being decommitted, as described above with reference to FIGS. 3, 5A and 5B. Note that FIG. 6 contains the same information as FIG. 5B but further includes the logical cluster values for each run.

Figure 7A:
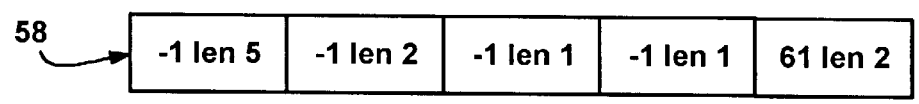
FIG. 7A is a representation of the extent list of FIG. 3 after having been modified.
Figure 7B:
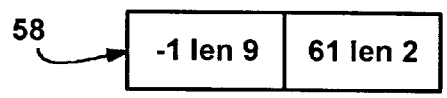
FIG. 7B is a representation of the extent list of FIG. 7A after having been optimized.

FIGS. 7A–7B illustrate an example wherein multiple runs are decommitted in a single API call. In FIG. 7A, starting at an offset of zero, the first nine clusters of FIG. 3 have been decommitted by the API call, either in a single API call or in a series of API calls. In FIG. 7B, the decommitted clusters are combined into a single contiguous run of decommitted space by summing the lengths of contiguous decommitted clusters. Although not necessary to the invention, periodically performing such an optimization prevents the number of entries in the extent list 58 (or in the data field $56_1$) from growing too large.

In keeping with one aspect of the invention, instead of simply removing a decommitted cluster run from the extent list 58, the file system 28 marks the run as decommitted. As a result, the decommitted space is still logically associated with the file $44_1$ so that the offsets and pointer values of the application program 30 relative to the file $42_1$ remain valid. For example, any time that the application program 30 sends the file system 28 an offset of 32 kilobytes from the start of the file $42_1$, the offset points to the correct physical cluster (cluster 50 in either FIG. 3 or FIG. 4) regardless of whether any file sections have been decommitted.

However, even though the application program's internal data pointers are unchanged, the application program 30 cannot go back and read or write decommitted space. To this end, if the application program 30 requests a read operation from the file system 28 but provides an offset or length that corresponds to decommitted space, the file system 28 recognizes from the file's meta data that the space has been decommitted and returns zeros (or alternatively an error) for the bytes in decommitted file sections. Indeed, the API 46 has been tentatively named "WriteZeros( )" because an application program 30 effectively zeros decommitted space for a given file. Note that the decommitted space will become free space that may be used by other files and will typically contain non-zero data, but decommitted space logically contains only zeros for the file from which the space was decommitted. Some highly secure file systems may physically zero free clusters.

Similarly, an attempt to write data to a file's decommitted space will be considered an error for that file. However, it is feasible for the file system 28 to allocate new space (which may coincidentally be the decommitted space) and write the data thereto. If so, the file system 28 also needs to adjust that file's meta data to reflect the location and size of the newly allocated space, i.e., insert a new run of clusters (or extend an existing run, if applicable) in the meta data at the proper location.

Another way in which alternative file systems map allocation units to a file is via a block list. As is known, a block list is simply a list of the allocation units associated with a file. For example, in the FAT system, each cluster of a file has an entry in the file allocation table pointing to the next cluster of the file (or an end-of-file marker). From that information a block list mapping the relationship between the various data clusters is placed in a buffer (or in persistent meta data storage) associated with that file. An exemplary block list 60 for the file 42$_1$ (which parallels the extent list 58 in FIG. 3 in the NTFS file system) is shown in FIG. 8.

Figure 8:
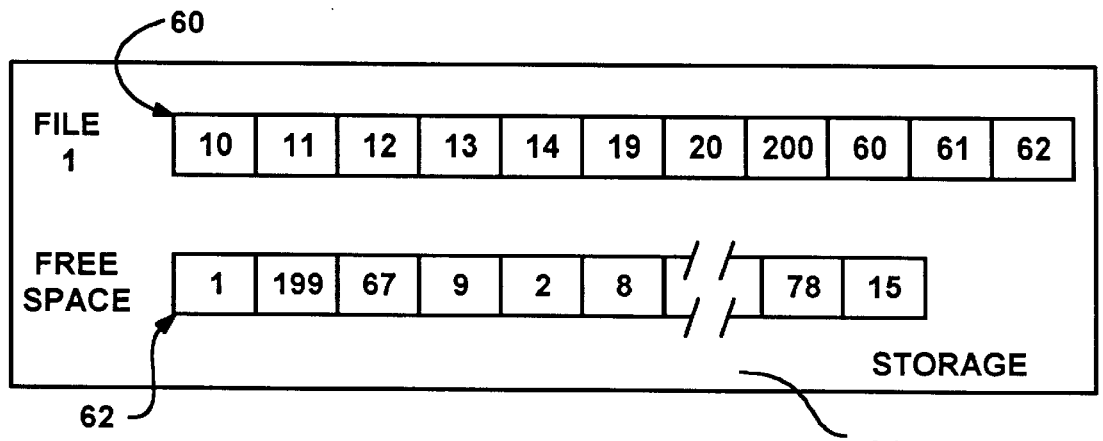
FIGS. 8 and 9 are representations of block lists before and after disk space is freed, respectively, in an alternative file system.

FIG. 8 also shows a block list 62 which represents the free space available on a disk volume. The information in the block list 62 may be in memory or on the disk drive, but in any event is available to the file system 28.

Figure 9:
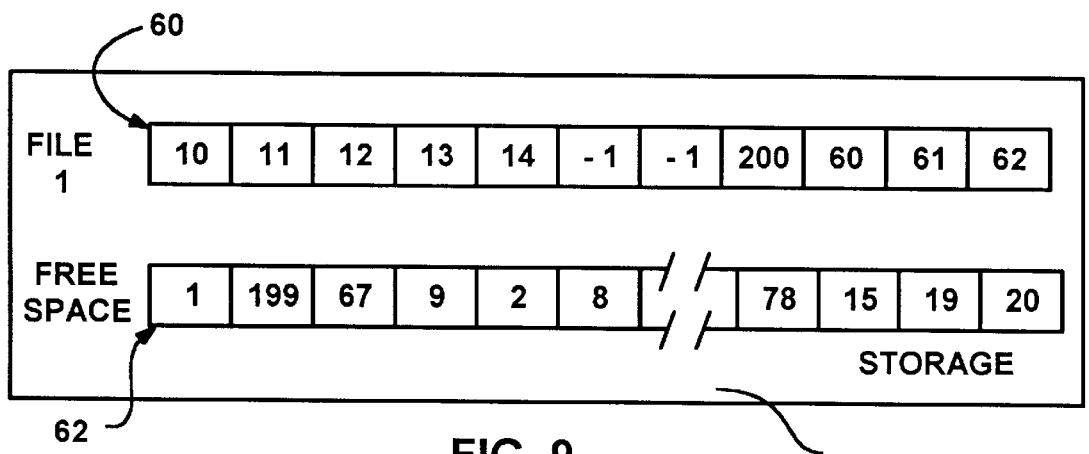

FIG. 9 shows the block list 60 for file 42$_1$ and the block list 62 for the free space after the WriteZero( ) API 46 was called with parameters of file handle 5, offset 20 KB, and length 8 KB. As previously described, step 100 of FIG. 10 selects the appropriate block list, step 102 converts the offset to a pointer to cluster 19, (five clusters from the start), and step 104 converts the length-to-decommit to two clusters. However, instead of step 106 (and possibly step 108) being executed, with a file system using block lists, step 104 immediately jumps to step 110. This is because there are no runs to deal with in a block list, as each cluster is individually listed, (with an inherent length of 1), and thus a decommit effectively always coincides with a boundary.

At step 110, the entries in the block list 60 for clusters 19 and 20 are decommitted by placing an indicator (minus one or the like) therein. At step 112, the clusters 19 and 20 are added to the free space, as shown in block list 62 of FIG. 9.

Regardless of whether block lists or extent lists are used, a benefit to using the file system 28 instead of an application program 30 to manage the decommitting of space is that many file systems, including NTFS, provide safeguards against system failures. For example, NTFS is a logging file system that guarantees all or nothing transactions, i.e., each operation is implemented atomically. If the system fails prior to a transaction being completed, NTFS uses its log to roll back the operations.

The present invention will now be described when utilized with a merge application program, (e.g., application program 30 is a merge application), as generally represented in the diagrams of FIGS. 11A–11D and the flow diagram of FIG. 12. As is known, a merge application program combines data from two or more sorted source files into a single sorted target file. For example, an application program may merge an alphabetized list of names and addresses with another such list, resulting in an alphabetized list that may be equal to the combined sizes of the source lists.

Figure 11A:
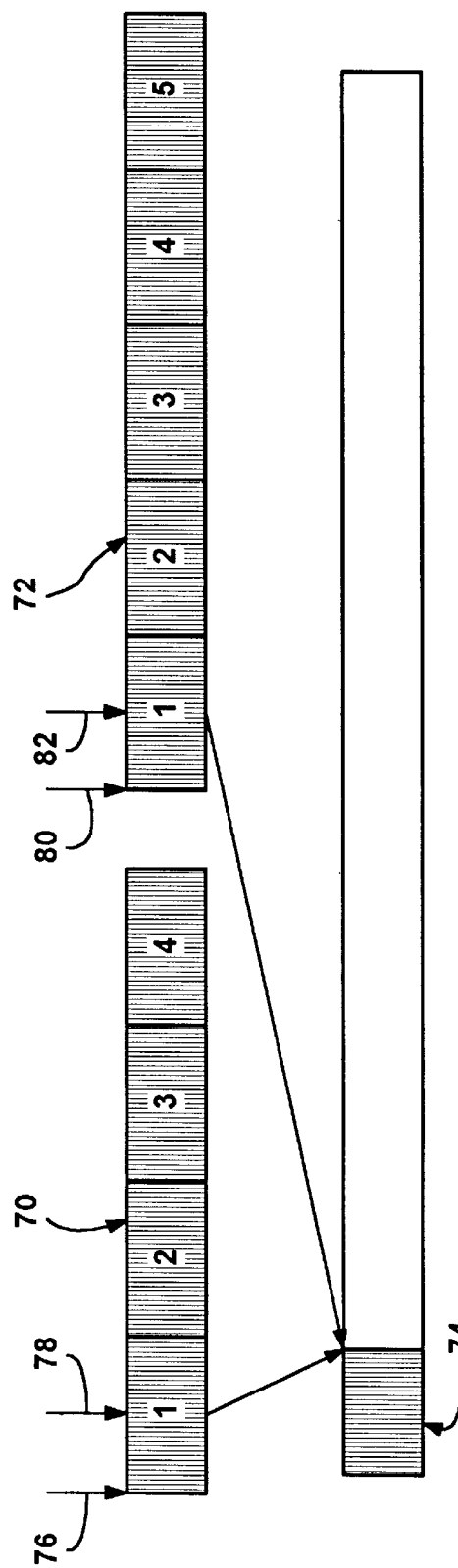
FIGS. 11A–11D are representations comprising a sequence of source files being merged into a target file.
Figure 12:
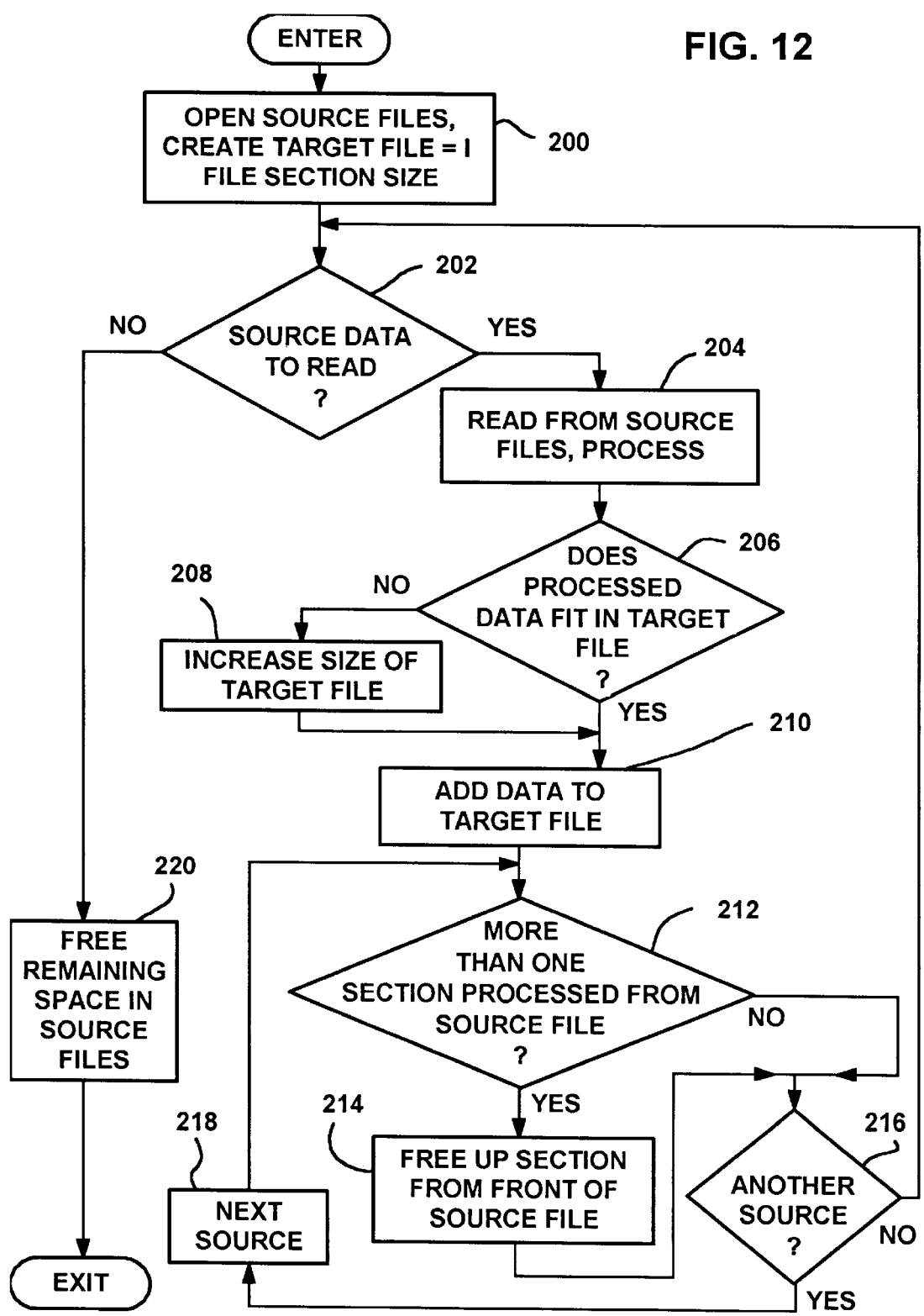
FIG. 12 is a flow diagram representing the general steps taken in merging the files as represented in FIGS. 11A–11D.

A preliminary step 200 (FIG. 12) of the merge application program 30 is to open at least two source files 70, 72 (FIG. 11A) and create a target file 74 (FIG. 11A). To save space, as will be explained below, the target file 74 is initially opened with a size of only one file section, e.g., 64 kilobytes. Note that as previously described, the application program 30 knows the size of a file section for the corresponding file system 28.

Step 202 tests to determine if source data is available to read. Since at this time the source files 70, 72 have just been opened, (and are non-zero in length in the present example), there is data to read and step 202 branches to step 204. At step 204 the first block of data (e.g., 20 kilobytes) is read from each source file 70, 72 and is processed by merging the data in a known manner. In the present example, the merged data might be 36 kilobytes in size. Note that the amount of data that is processed from one source file typically does not equal the amount processed from another. Accordingly, each time through the loop, additional data is only read when needed from a given source file at step 204.

FIG. 11A shows the merge application program 30 in an early stage of merging the two source files 70, 72 into the target file 74, wherein the shaded areas represent data within a file. For purposes of simplicity, the source files 70, 72 are shown as being composed of four file sections and five file sections, respectively, although it is understood that the source files may be any size, and not necessarily an exact multiple of file sections. The application program 30 maintains a first pointer 76 or the like indicating the start of the first source file 70 (zero bytes in FIG. 11A) and a second (read) pointer 78 or the like indicating the point to which data has been read from the source file 70 (or buffered, processed and/or written as described below). Similarly, the application program 30 maintains a third pointer 80 indicating the start of the second source file 72 (zero bytes in FIG. 11A) and a fourth (read) pointer 82 indicating the point to which data has been read from the file 72. The application program 30 also maintains a target (write) pointer to track the point to which data has been written to the target file.

Step 206 checks to determine if the processed data (40 kilobytes) will fit in the remaining size in the target file 74. In this instance the target file has just been opened, so the entire 64 kilobytes is available for filling with the 36 kilobytes of processed data. Accordingly, the process branches to step 210. Had sufficient space not been available in the target file 74, step 206 alternatively would have branched to step 208 where the size of the target file 74 would be increased by requesting additional disk space from the file system. Note that adding space to the target file 74 only when needed enables the merging to occur without having to initially create a target file that is very large.

Figure 11B:
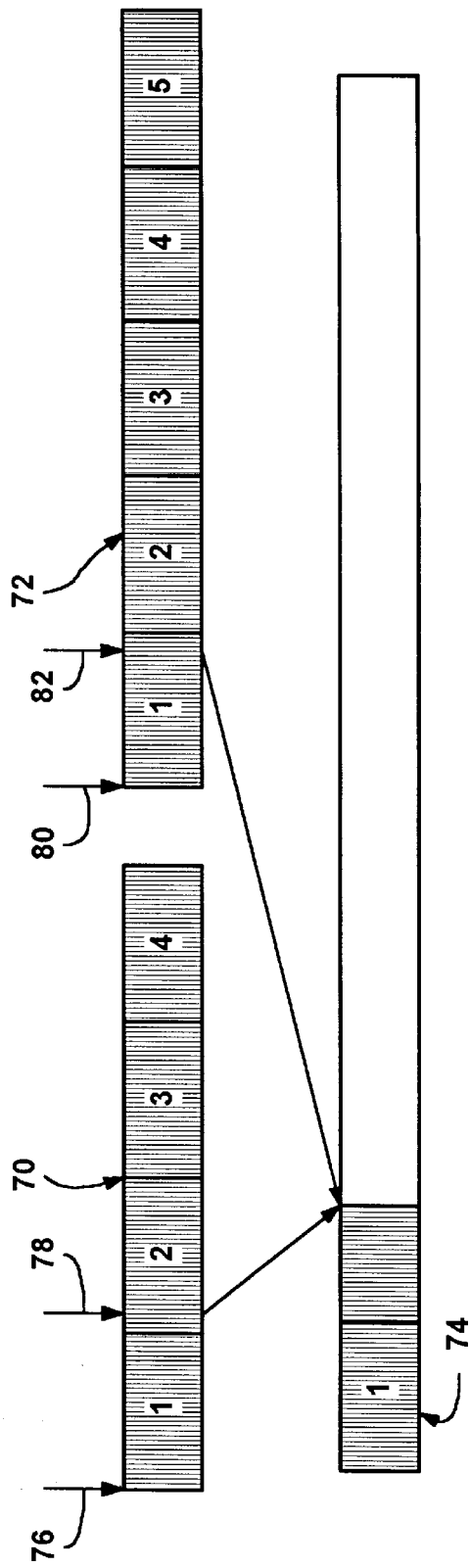

In any event, at step 210 the processed data is written into the target file 74. As can be appreciated, to protect against system failures, instead of tracking the reading of bytes, the pointers 78 and 82 may track the point to which data has been read from each source 70, 72, processed and safely written to the target file 74. This prevents data that is buffered from being lost in the event of a system failure. Thus, the pointers 78, 82 may be increased accordingly at this time and move to the right in FIGS. 11A–11D. For example, as shown in FIG. 11B, pointers 78 and 82 have moved to the right relative to their positions in FIG. 11A.

Step 212 (FIG. 12) determines if data of more than one file section size (64 kilobytes in the present example) has been read (or processed and safely written) from the source file 70. For example, to determine how much data has been read from the source file 70, the process first calculates the difference between pointer 78 and pointer 76. As shown in FIG. 11B, the difference between pointer 78 and 76 is greater than one file section. Accordingly, at step 214, the file section denoted by "1" in file 70 is freed.

Step 214 of the process decommits a file section from the front of the file 70 by calling the WriteZero( ) API 46 as explained above. To this end, the API 46 is passed the file handle of file 70, the offset in bytes (zero in FIG. 11B) and the length to decommit (64 kilobytes, i.e., one file section). As also described above, the WriteZero( ) API 46 accomplishes this by manipulating the meta data corresponding to file 70. Note that since the data is read and processed sequentially in a merge application, the file sections are decommitted from the front. Of course, other application programs may decommit any section of a file.

Figure 11C:
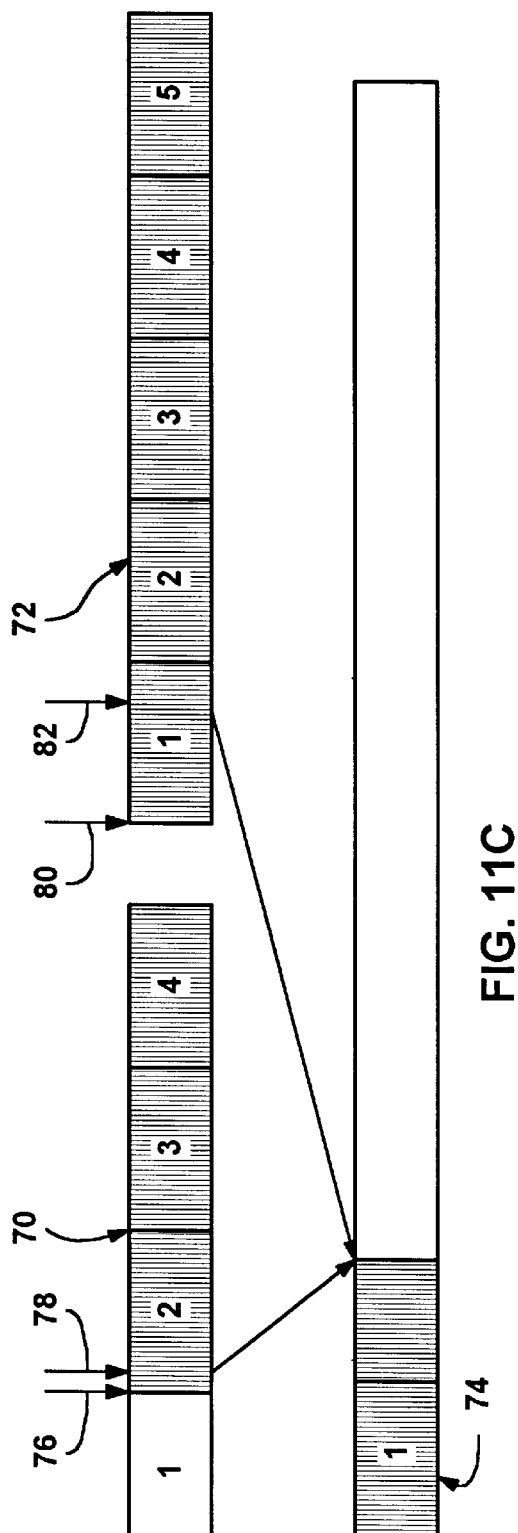

FIG. 11C shows the state of the files after the file section "1" has been freed. The pointer 76 has been advanced to the start of file section "2," e.g., 64 kilobytes, to reflect that file section "1" has been decommitted. Although the application program 30 maintains its pointers and offsets such that "zero" still indicates the start of the now-freed file section "1," the file system 28 has marked that space as free.

Following step 214, step 216 determines if all of the source files have been tested, and, if not, branches to step 218 to select the next source file for evaluation. Thus, in the present example, source file 72 has yet to be tested, so step 216 branches to step 218, after which step 212 is again executed, this time using the pointers 80, 82 of the file 72. However, as represented in FIG. 11B and as determined at step 212, in file 72 the difference between pointer 82 and pointer 80 is less than one file section. Thus no space is freed (step 214 is skipped this time) and the process directly returns to step 216. Since no more source files need to be tested, the process returns to step 202 to read more data.

Figure 11D:
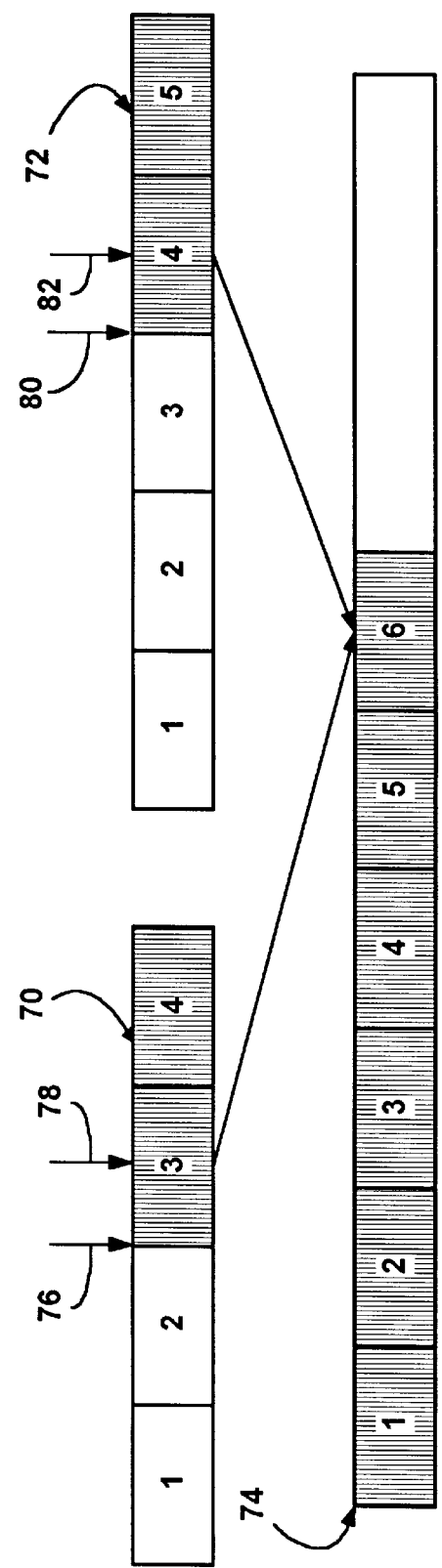

FIG. 11D shows the merge at a still later stage. As seen in FIG. 1D, the source files 70 and 72 shrink as the target file 74 grows. As a result, the file system 28 is able to add space to the target file 74 that was formerly allocated to the source files 70 and 72. As can be appreciated, with this technique the file system 28 only needs to allocate a small amount of temporary space at any given time. Indeed, provided that the application program 30 appropriately checks to see if a file section has been removed from its source files, in the worst case the total temporary space approximately equals the number of source files times the size of a file section. In the best case, the total temporary size is one file section plus a small delta.

Eventually, there will be no more source data to read from either of the files 70 or 72. At such a time, step 202 (FIG. 12) will branch to step 220 where any remaining source file space may be freed, e.g., source files 70 and 72 are deleted.

Figure 13A:
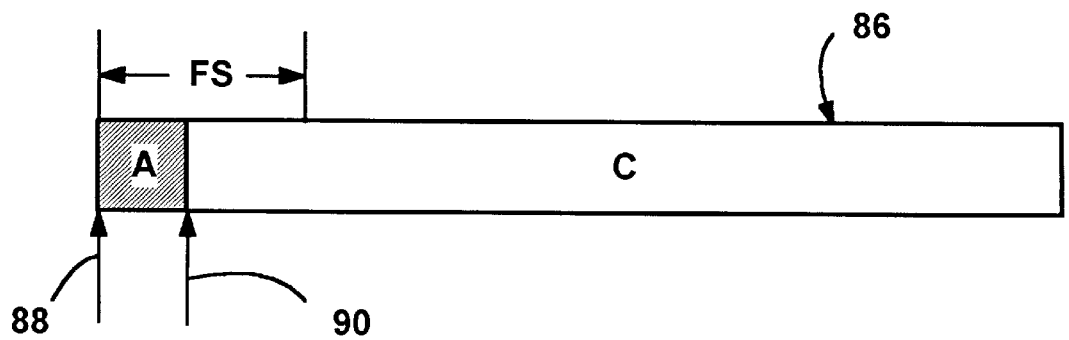
FIGS. 13A–13C and 14A–14C are representations of FIFO queues being processed with data dequeued and freed.

The present invention will now be described when utilized with a persistent FIFO queue, as generally represented in the flow diagram of FIG. 15. FIG. 13A shows a persistent FIFO queue file 86 having an amount of data, denoted by section "A," that has been previously dequeued but not cleaned from the file 86. Although not represented as such herein, "A" may be zero bytes. A pointer 88 or the like tracks the location (e.g., byte offset) where the dequeued space begins, and another data pointer 90 or the like tracks the start of the remaining, non-dequeued data items in section "C" of file 86. Note that if space was previously decommitted as described above, the start of the dequeued space is not at byte zero from the perspective of the application program 30, a situation which would be reflected by a non-zero value in data pointer 88. By way of example, pointer 88 may indicate a position of 450 kilobytes, while pointer 90 may indicate 475 kilobytes.

Figure 13B:
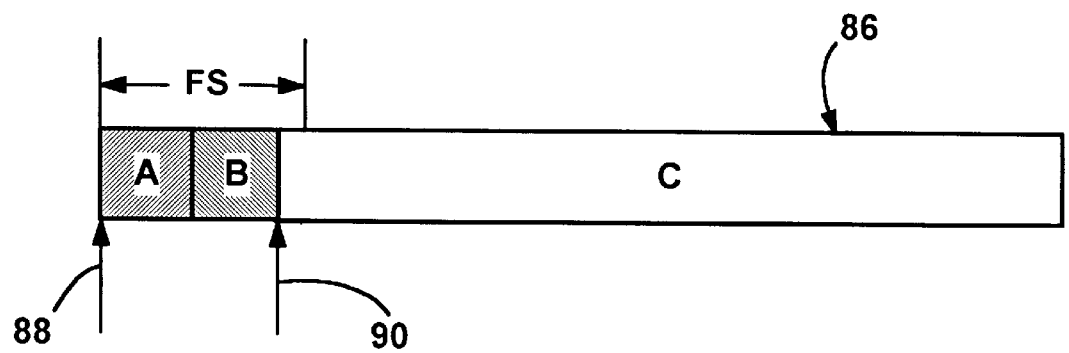
Figure 15:
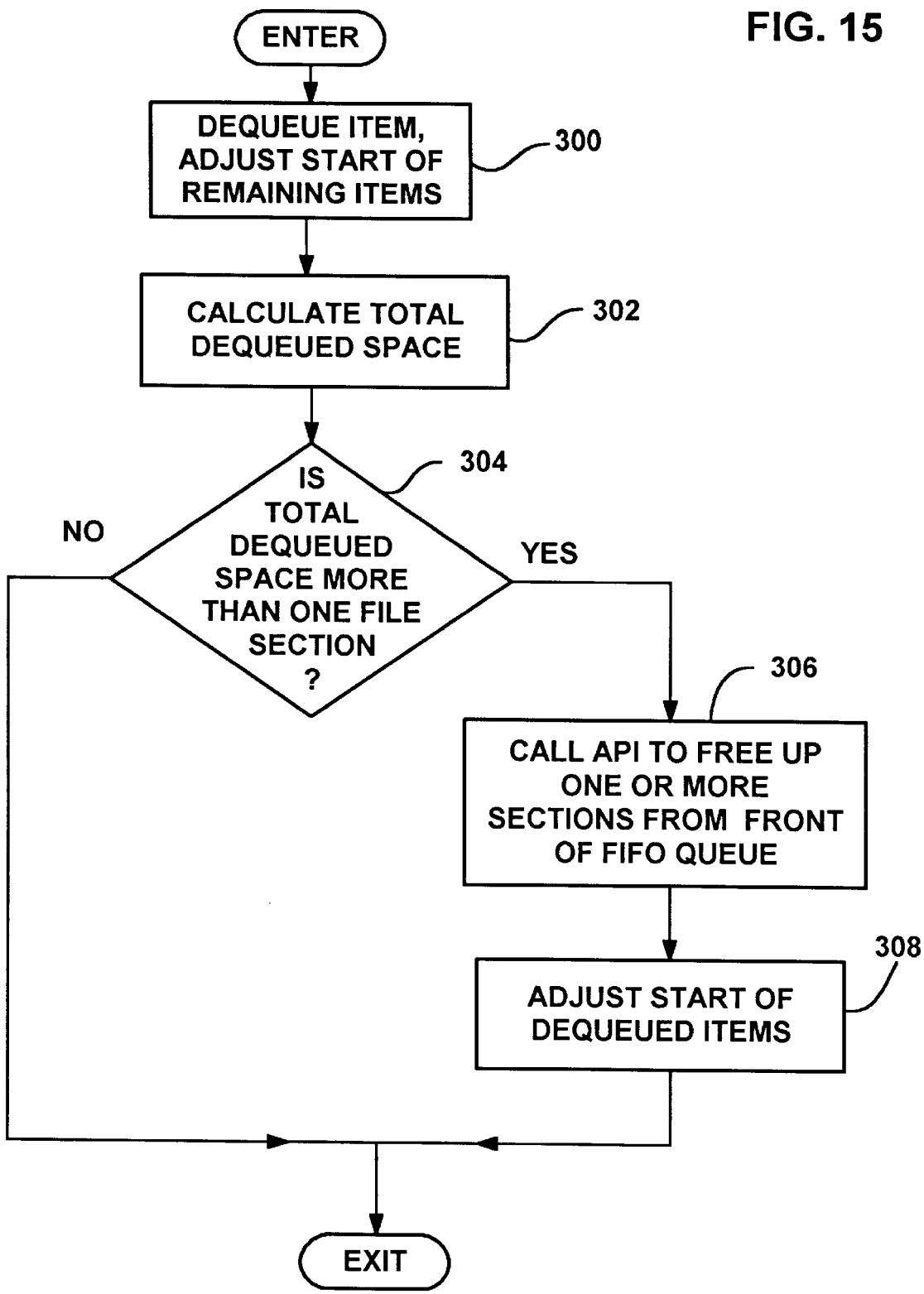
FIG. 15 is a flow diagram representing the general steps taken in freeing dequeued space as represented in FIGS. 13A–13C and FIGS. 14A–14C.

After a DeQueue operation has been executed at step 300 of FIG. 15, (thereby removing one or more items from the front of the file 86), another amount of data has been dequeued. This additional dequeued data is shown in FIG. 13B as section "B." As can be appreciated, as part of the dequeueing operation, the pointer 90 is adjusted to indicate the new starting location of the remaining, non-dequeued section "C" data. In the present example, pointer 90 may have been increased to indicate a position of 500 kilobytes. It can be appreciated that the process shown in FIG. 15 may be executed after any number of dequeueing operations rather than after each item is dequeued.

Figure 13C:
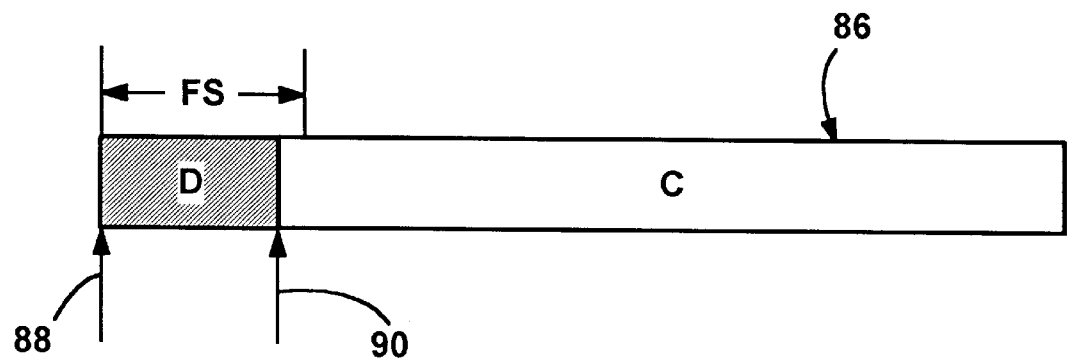

Following the dequeueing operation, at step 302 the total amount of dequeued space is calculated, for example by subtracting the byte value stored in pointer 88 from the byte value stored in pointer 90. This total size is represented in FIG. 13B by the combined "A" and "B" sections, and in the present example equals 50 kilobytes (i.e., 500 kilobytes minus 450 kilobytes). At step 304 this total dequeued amount is compared against the size of a file section, represented in FIGS. 13A–13C by the interval denoted "FS." In the present example, a file section is 64 kilobytes in size, an amount that is fixed and known to the application program 30. Since 50 kilobytes is less than the 64 kilobyte size of the file section, no space is decommitted at this time and step 304 branches to exit the process of FIG. 15. However, the next time through the process of FIG. 15, instead of starting with the section "A," the pointer 90 has advanced to beyond where both sections "A" and "B" have been dequeued (i.e., an offset of 500 kilobytes in this example). As a result, the FIFO queue file 86 now has a new amount of data, (i.e., 50 kilobytes) that has been previously dequeued but not cleaned from the file 86, denoted by section "D" in FIG. 13C.

Figure 14A:
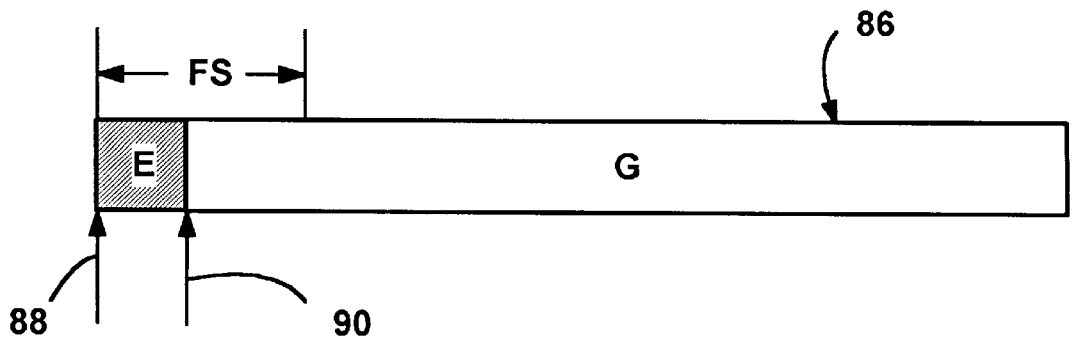

In contrast to FIGS. 13A–13C, FIGS. 14A–14C represent the situation wherein the total dequeued space is greater than a file section. As before, FIG. 14A shows the FIFO queue file 86 having an amount of data (possibly zero bytes) that has been previously dequeued but not cleaned from the file 86. This data is denoted by section "E," and, for example, may begin at 700 kilobytes and extend to 730 kilobytes minus one byte. Note that in FIGS. 14A–14C, the pointers 88 and 90 maintain similar data pointer information as previously described with reference to FIGS. 13A–13C, and in this example have values (and thus point to) 700 kilobytes and 730 kilobytes, respectively.

Figure 14B:
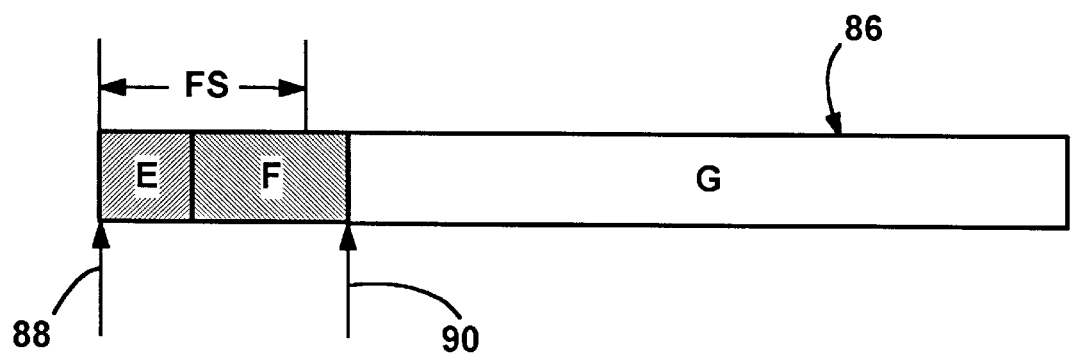

As shown in FIG. 14B, after a DeQueue operation has been executed at step 300 of FIG. 15, another amount of data has been dequeued, denoted by section "F." Again, the pointer 90 is adjusted to indicate the new starting location of the remaining, non-dequeued section "G" data, and for example is increased to 780 kilobytes. However, as apparent from FIG. 14B, this time the total dequeued space ("E" plus "F") is larger than one file section, the file section size in FIGS. 14A–14C again represented by the interval denoted "FS".

Accordingly, at step 302 the total amount of dequeued space is calculated, for example by subtracting pointer 88 (700 kilobytes) from pointer 90 (780 kilobytes) to obtain 80 kilobytes. At step 304 this total dequeued amount of 80 kilobytes is compared by the application program against the known size of a file section, 64 kilobytes. However, this time the dequeued space is greater than a file section size and consequently the comparison at step 304 branches to step 306.

In keeping with the invention, the application program calls the API in the file section to decommit space from the front of file 86. An exemplary call might be WriteZeros (5, 700 KB, 64 KB), where "5" represents the file handle. Note that the persistent FIFO queue application program 30 can decommit more than one file section by simply dividing the dequeued space by the size of a file section, with the quotient equalling the number of file sections to decommit. Alternatively, the process can repeatedly decommit one file section at a time by looping back until the remaining dequeued space is less than one file section.

Figure 14C:
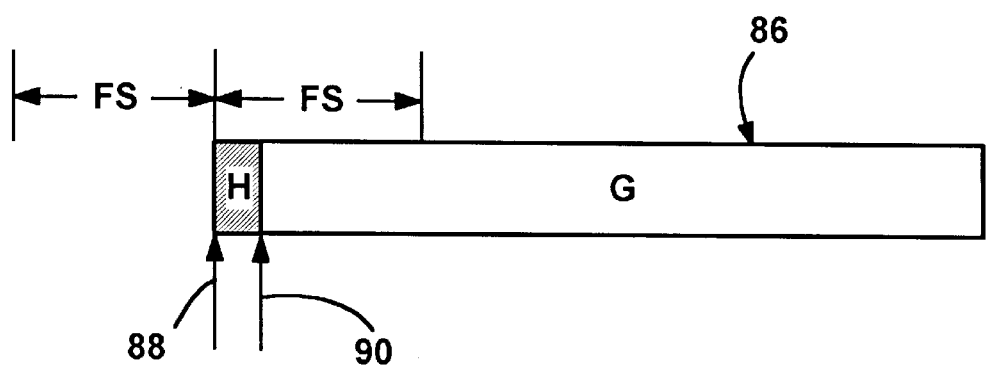

At step 308, the API 46 in conjunction with the file system 28 frees up the appropriate number of file sections, and adds the freed space to the available disk space. This is done by manipulating the file's meta data and the free space bitmap or the like as previously described. At step 310, the application program 30 moves the pointer 88 to the start of any remaining dequeued space that was not decommitted. In the present example, pointer 88 increases to 764 kilobytes (700 kilobytes plus 64 kilobytes). The increase is best shown in FIG. 14C, with section "H" representing the remaining space (16 kilobytes) that is dequeued but not cleaned (decommitted) from the file.

As can be appreciated, freeing space from other than the end of the file 86, in this instance the front, provides a rapid and inexpensive way in which to clean a persistent FIFO queue. Indeed, the cleaning operation requires no copying of data or complex file manipulation, and is thus efficient enough to run every time an item is dequeued, if desired.

However, although the physical file size is maintained by the cleaning operation, the logical file size continues to grow with persistent FIFO queues and possibly other applications. For example, the logical file size increases as new items are added to the queue, even though the front of the file shrinks as space is decommitted. Also, the pointers continue to increase in value. While this is not perceived to be a problem in NTFS where file sizes and pointers can logically grow to $2^{64}$ bytes, other file systems may eventually have problems dealing with such ever-increasing numbers.

As a result, although not necessary to the invention, application programs may be written to recognize the possibility of such runaway growth and effectively reset the file size and pointers when desirable. To this end, an application program 30 copies the useful (non-dequeued) data to a temporary file and the space that is occupied by the original file is freed, i.e., the original file is deleted. The meta data is then remapped to point to the temporary file, and the pointers 88, 90 reset to zero. In effect, the hole in the front of the file is removed.

Although some data copying is done with such an optimization, the optimization need not be performed frequently. For example, a desirable time to perform such an optimization is when the amount of remaining useful data is relatively small, since not much copying is required. Another time that is desirable is when the file size or pointer values exceed some safe, predetermined threshold amount.

It is also feasible for the file system 28 to perform such an optimization in conjunction with the application program 30 adjusting its internal pointers. For example, if requested by an application program 30, possibly through another API, a run of decommitted clusters may be removed from a file's meta data and the file size adjusted accordingly. Similarly, in a file system such as the FAT system, the information pointing to the first cluster and/or the FAT table entries may be modified to skip over decommitted clusters. When the decommitted space is contiguous from the original start of a file, the zero point in both the meta data and in the application program are shifted. It should be noted however that such an optimization is more complex when the decommitted data is not contiguous at the start of the file, since the application program 30 has to adjust its pointers for each non-contiguous, decommitted file section.

As can be seen from the foregoing detailed description, there is provided a method and mechanism for freeing disk space allocated to any logical portion of a file in a file system. The method and mechanism rapidly free disk space while eliminating the need for copying large amounts of data or allocating large amounts of temporary space. The method and mechanism are built into a file system, function with existing safeguards possessed by a file system to protect against system failures, and may be easily utilized by an application program such as a merge application or an application that operates with a persistent FIFO queue. The method and mechanism are fast, simple and reliable, are extensible and work with virtually any file system.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method of freeing storage space allocated to a file in a persistent storage medium wherein a file system maintains mapping data associating the file with physical storage space locations in the storage medium, comprising:

providing the file system with information identifying the file and a selected logical block of data in the file that does not include a logical end of the data;

receiving the information at the file system and accessing the mapping data to determine at least one physical location in the persistent storage medium corresponding to the selected logical block of data; and modifying the mapping data in the file system independent of a data write to indicate that the at least one physical location is no longer allocated to the file.

2. The method of claim 1 wherein the at least one physical location has a first indicator in the mapping data corresponding to the identity thereof, and modifying the mapping data in the file system comprises writing a second indicator in the mapping data in place of the first indicator and maintaining the second indicator in association with the file.

3. The method of claim 1 wherein the file system maintains free space information representing physical locations that are free space not allocated to any file, and further comprising modifying the free space information to indicate that the at least one physical location is free space.

4. The method of claim 3 wherein the free space information is maintained in a bitmap having bits corresponding to the physical locations on the disk, and wherein modifying the free space information comprises changing the value of at least one bit corresponding to the at least one physical location.

5. The method of claim 1 further comprising determining a fixed size for the selected logical block of data.

6. The method of claim 1 wherein providing the file system with information includes calling an application programming interface.

7. The method of claim 1 wherein providing the file system with information identifying the file includes providing a file handle to the file system.

8. The method of claim 1 wherein providing the file system with information identifying the logical block of data includes providing a size value representative of a size of the block.

9. The method of claim 8 wherein the size value is a number of bytes, and receiving the information at the file system and accessing the mapping data includes converting the number of bytes to a number of allocation units.

10. The method of claim 1 wherein providing the file system with information identifying the logical block of data includes providing an offset value representative of a logical location of the block within the file.

11. The method of claim 10 wherein the offset value is a number of bytes, and receiving the information at the file system and accessing the mapping data includes converting the logical location to a particular allocation unit.

12. The method of claim 1 wherein the mapping data for the file is maintained within a record corresponding to the file in a master file table of records.

13. The method of claim 1 wherein the allocation units are clusters, and wherein the mapping data for the file is maintained within an extent list of cluster runs.

14. The method of claim 1 wherein the allocation units are clusters, and wherein the mapping data is maintained within a block list of clusters.

15. The method of claim 1 wherein providing the file system with information identifying a selected logical block of data comprises selecting the block of data from the logical start of the file.

16. The method of claim 15 further comprising sequentially reading an amount of data from each of a plurality of source files, processing the data into combined data, and writing the combined data to a target file, and wherein selecting the block of data from the logical start of the file includes selecting the block from among the processed data.

17. The method of claim 15 further comprising dequeuing an amount of data from a first in, first out queue file and selecting the block of data from the logical start of the file includes selecting the block from among the dequeued amount of data.

18. In a computer system including a permanent storage medium having a plurality of physical locations for storing data, a mechanism for freeing physical storage space allocated to a file of logical data, comprising:
 a file system having mapping data, the mapping data associating the logical data of the file with physical locations of the storage medium;
 means for receiving a request to free a section of logical data allocated to the file; and
 means for processing the request including means for accessing the mapping data to determine at least one physical location corresponding to the section of logical data and for modifying the mapping data independent of a data write to disassociate the at least one physical location from the logical data of the file.

19. The mechanism of claim 18 wherein the at least one physical location has a first indicator in the mapping data corresponding to the identity thereof, and the means for modifying the mapping data includes means for overwriting the first indicator with a second indicator.

20. The mechanism of claim 18 wherein the file system maintains free space information representing physical locations that are free space not allocated to any file, and wherein the means for processing the request includes means for modifying the free space information to indicate that the at least one physical location is free space.

21. The mechanism of claim 20 wherein the storage medium is a disk, and wherein the free space information is maintained in a bitmap stored in association with the disk.

22. The mechanism of claim 18 wherein the physical locations of the storage medium comprise clusters on a disk, and wherein the section of logical data corresponds to at least one cluster.

23. The mechanism of claim 18 wherein the logical section of data is identified by an offset value in bytes and a number of bytes thereafter.

24. The mechanism of claim 18 wherein the mapping data for the file is maintained within a record corresponding to the file in a master file table of records.

25. The mechanism of claim 18 wherein the allocation units are clusters, and wherein the mapping data for the file is maintained within an extent list of cluster runs.

26. The mechanism of claim 18 wherein the allocation units are clusters, and wherein the mapping data is maintained within a block list of clusters.

27. The mechanism of claim 18 wherein the selected section of data includes data from the logical start of the file.

28. The mechanism of claim 18 wherein the means for processing the request includes an application programming interface.

29. The mechanism of claim 28 wherein the application programming interface is called by an application program that sequentially merges a plurality of source files into at least one target file.

30. The mechanism of claim 28 wherein the application program interface is called by an application program that dequeues an amount of data from a first in, first out queue file wherein the selected section of data is within the dequeued amount of data.

31. A method of freeing storage space allocated to a file in a persistent storage medium wherein a file system maintains mapping data associating the file with physical storage space locations in the storage medium, comprising:
 selecting a section of data beginning at the logical start of the file;
 providing the file system with information identifying the file and the section of data;
 accessing the mapping data via the file system to determine at least one physical location in the persistent storage medium corresponding to the selected logical section of data; and
 modifying the mapping data in the file system to indicate that the at least one physical location is no longer allocated to the file.

32. A method of merging source data from a plurality of source files into a target file, wherein the files are stored in a persistent storage medium and managed by a file system, comprising:
 reading a block of data from each of the source files;
 sequentially processing the data from each of the source files into a combined block of data, and tracking the amount of data processed from each of the source files;
 writing at least part of the combined block of data into the target file;
 selecting one of the source files as a selected file;
 selecting a section of data from the logical start of the selected file;

providing the file system with information identifying the selected file and the selected section of data;

accessing mapping data maintained by the file system for the selected file to determine at least one physical location in the persistent storage medium corresponding to the selected logical section of data; and modifying the mapping data to indicate that the at least one physical location is no longer allocated to the selected file.

33. A method of cleaning data from a first in, first out (FIFO) queue file, wherein the FIFO queue file is stored in a persistent storage medium and managed by a file system, comprising:

dequeuing an amount of data from the FIFO queue file;

selecting a section of dequeued data from the logical start of the selected file;

providing the file system with information identifying the selected section of data;

accessing mapping data maintained by the file system for the FIFO queue file to determine at least one physical location in the persistent storage medium corresponding to the selected section of data; and modifying the mapping data to indicate that the at least one physical location is no longer allocated to the FIFO queue file.

34. A computer-readable medium having computer-executable instructions for performing the method of claim 1.

35. A computer-readable medium having computer-executable instructions for performing the method of claim 31.

36. The method of claim 31, wherein modifying the mapping data in the file system to indicate that the at least one physical location is no longer allocated to the file comprises modifying the mapping data independent of a data write.

37. A computer-readable medium having computer-executable instructions for performing the method of claim 32.

38. The method of claim 32, wherein modifying the mapping data in the file system to indicate that the at least one physical location is no longer allocated to the selected file comprises modifying the mapping data independent of a data write.

39. The method of claim 32, further comprising, comparing the amount of data processed from the selected file against a size value.

40. A computer-readable medium having computer-executable instructions for performing the method of claim 33.

41. The method of claim 33, wherein modifying the mapping data to indicate that the at least one physical location is no longer allocated to the FIFO queue file comprises modifying the mapping data independent of a data write.

42. The method of claim 33, further comprising, comparing the amount of data dequeued from the FIFO queue file against a size value.

* * * * *